April 13, 1937.  W. L. GILMORE  2,077,360
SEPARABLE FASTENER
Filed Feb. 3, 1932
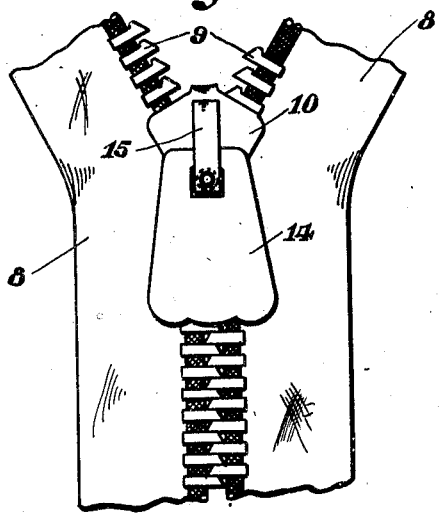
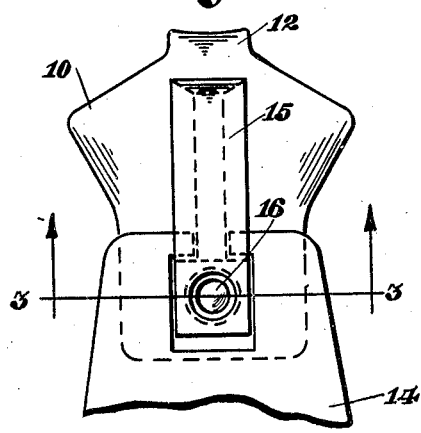
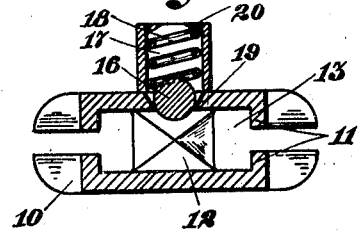
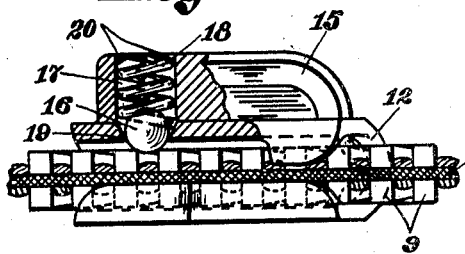
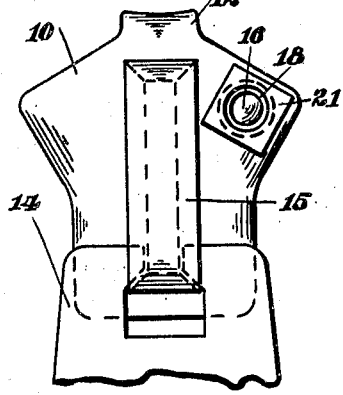
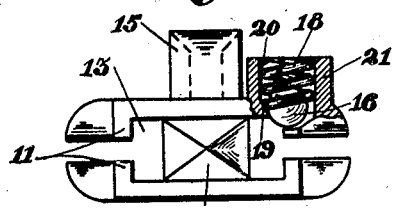
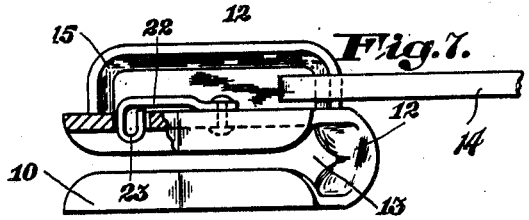
INVENTOR.
William L. Gilmore
BY
ATTORNEY Patented Apr. 13, 1937

2,077,360

UNITED STATES PATENT OFFICE 2,077,360

SEPARABLE FASTENER

William L. Gilmore, Meadville, Pa., assignor to Hookless Fastener Company, a corporation of Pennsylvania Application February 3, 1932, Serial No. 590,694

7 Claims. (Cl. 24—205)

My invention relates to slide fasteners and particularly to devices for preventing accidental and unintended opening of the fastener in garments or other places where the fastener is subjected to stress.

An object of the invention is to provide an exceedingly simple check device which will offer limited resistance to movement of the slider at all times, sufficient to prevent unintended opening of the fastener under normal conditions and yet not offer to great resistance to prevent movement of the slider with facility when desired to open or close the fastener.

One advantage of my novel check device is that it requires no attention by the user of the fastener and is not dependent in any way on the operation of the pull tab. Other objects and advantages of the invention will hereinafter more fully appear.

In the accompanying drawing, I have shown for purposes of illustration three embodiments which my invention may assume in practice. In this drawing:

Fig. 1 is a face view of a slide fastener equipped with a slider embodying my invention;

Fig. 2 is an enlarged plan view of the slider;

Fig. 3 is a cross sectional view on line 3—3 of Fig. 2;

Fig. 4 is a side view with parts in section;

Fig. 5 is a plan view illustrating a modification;

Fig. 6 is an end view of the slider in Fig. 5 with the check device illustrated in section; and Fig. 7 illustrates a second modification.

The fastener shown is a commonly known type which has flexible stringers 8 having fastener elements 9 attached to the meeting edges of the stringers. The fastener elements are spaced apart and arranged in staggered relation on opposite stringers so that they can be engaged and disengaged rapidly by movement of a slider 10 along the elements from one end to the other of the fastener. The interlocking principle of the fastener illustrated is well known in the art and will not be further described. The slider shown comprises a channeled body member with side flanges 11 and a neck connection 12 defining a Y-shaped channel 13 for receiving and guiding the fastener elements into and out of engagement. The slider is conveniently actuated along the elements in opening and closing the fastener by a pull tab 14 which is adapted to shift from one end to the other of a track lug 15 depending on the direction of movement of the slider.

In carrying out my invention a check piece is mounted so as to bear continuously against the fastener elements and offer limited resistance to movement of the slider. By limited resistance I mean, as opposed to an unlimited check or positive lock, a resistance which prevents unintentional or accidental movement of the slider, but permits a normal operating force to overcome this resistance and move the slider. In the form illustrated in Figs. 1 to 4 the check piece is in the form of a round ball 16 mounted in a recess 17 which communicates with the slider channel 13. Resilient means such as a coiled spring 18 is arranged in the recess to press the ball against the seat 19 and hold it at all times in contact with the fastener elements in the slider channel. The spring may be confined in the recess by simply peening over the metal as indicated at 20. In Figs. 1 to 4 the check piece is located centrally of the slider and in an extension of the lug 15. If desired, however, it may be arranged as illustrated in Figs. 5 and 6 wherein the ball and spring are mounted in a boss 21 at one side of the track lug.

In Fig. 7 the check device is simply a flat spring member 22 anchored to the slider at one end and at its other end having a projection 23 with a rounded engaging surface adapted to bear against the fastener elements. For simplicity, in manufacture, this spring extension might be struck out and bent up from the metal of one of the slider wings.

In operation, it will be understood that the check piece presents rounded or beveled surfaces to the fastener elements in either direction of travel of the slider so that while offering a certain amount of resistance, the slider can still be moved without much effort because the rounded or beveled surfaces will cause the check piece to ratchet over the fastener elements. The arrangement shown in Figs. 5 and 6 would probably offer more resistance to movement than an arrangement shown in Figs. 1 to 4 because the check piece has a better chance to catch between the fastener elements.

As a result of my invention, it will be observed that a check device which will serve the purpose of preventing opening of a slide fastener under most normal conditions, has been devised which is operative without attention from the user of the fastener independently of movement of the pull tab. In fact, the user of the fastener would probably never be aware of the presence and functioning of the check device.

While I have in this application specifically described three embodiments which my invention may assume in practice, it will be understood that these embodiments are merely for the purpose of illustration and description and that various other forms may be devised within the scope of my invention as defined in the appended claims.

What I claim as my invention is:

1. In a slide fastener, means supporting cooperating rows of interlocking fastener elements, a channeled slider movable over said elements for engaging and disengaging the same, a check piece movably mounted on said slider having sloping surfaces engaging said fastener elements in either direction of travel of the slider, resilient means for pressing said check piece into contact with said fastener elements, said resilient means being constructed and arranged continuously to provide limited resistance to movement of said slider, and a pull tab secured to said slider independently of said check piece.

2. In a slide fastener, means supporting cooperating rows of interlocking fastener elements, a channeled slider movable over said elements for engaging and disengaging the same, a check piece movably mounted on said slider having a rounded surface adapted to bear against said fastener elements, a spring holding said check piece in contact with said fastener elements, said spring being constructed and arranged continuously to provide a limited resistance to movement of said slider, and a pull tab secured to said slider independently of said check piece.

3. In a slide fastener, means supporting cooperating rows of interlocking fastener elements, a channeled slider movable over said elements for engaging and disengaging the same, means on the slider providing a recess communicating with the channel of said slider, a ball check piece mounted in said recess, resilient means bearing against said ball check piece for holding it in position to project into the slider channel for engagement with the fastener elements, said resilient means being constructed and arranged continuously to provide a limited resistance to movement of said slider.

4. In a slide fastener, means supporting cooperating rows of interlocking fastener elements, a channeled slider movable over said elements for engaging and disengaging the same, a check piece carried by said slider comprising a flat spring mounted on said slider and a projection at one end extending into the channel of said slider, said projection having a rounded surface bearing against the fastener elements, and said spring being constructed and arranged continuously to provide a limited resistance to movement of the slider, and a pull tab secured to said slider independently of said check piece.

5. In a slide fastener, a pair of fastener stringers, cooperating rows of interlocking elements on said stringers, a channeled slider mounted on said fastener elements, a pull tab hinged to said slider, a check piece carried by the slider in contact with the fastener elements, and means for holding said check piece at all times in contact with said fastener elements independently of the operation of the pull tab.

6. In a slide fastener, means supporting rows of interlocking fastener elements, a channeled slider movable over said elements for engaging and disengaging the same, a check piece movably mounted on said slider and having means engaging said fastener elements in either direction of travel of the slider, resilient means for pressing said check piece into contact with said fastener elements, said resilient means being constructed and arranged to provide limited resistance to movement of said slider, and a pull tab secured to said slider independently of said check piece.

7. In a slide fastener a pair of fastener stringers, cooperating rows of interlocking elements on said stringers, a channeled slider mounted on said fastener elements for engaging and disengaging the same, a pull tab hinged to the slider and check means carried by the slider which at all times resists movement of the slider in either direction, said check means comprising element engaging means, and means for resiliently holding said engaging means at all times in contact with said fastener elements independently of the operation of the pull tab.

WILLIAM L. GILMORE.